Patented Oct. 17, 1922.

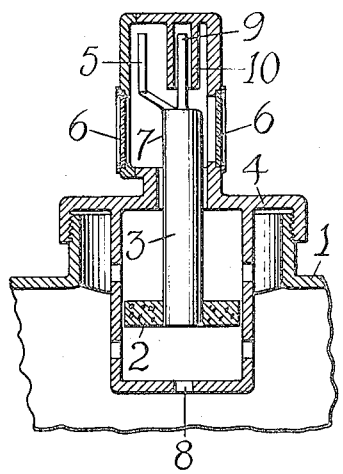
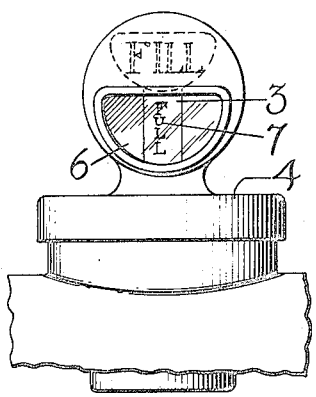
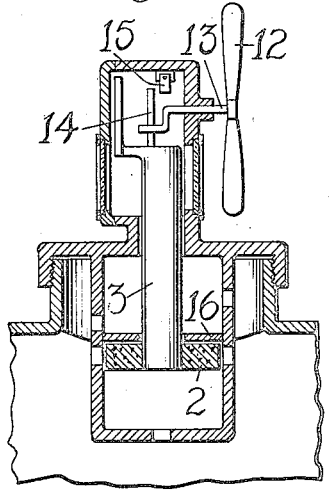
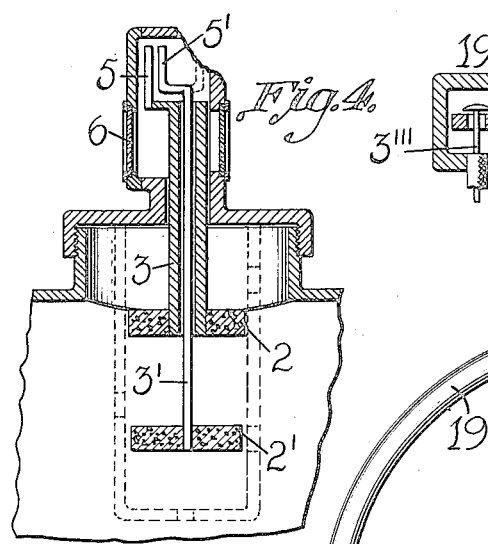
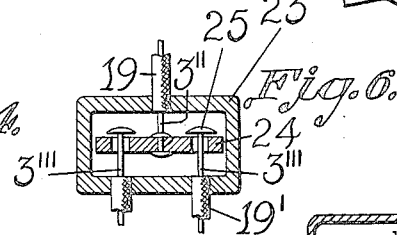
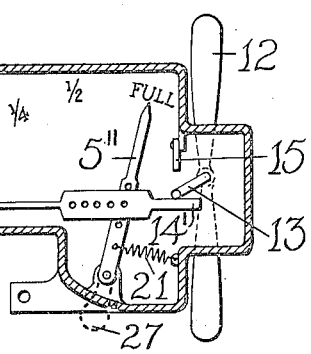
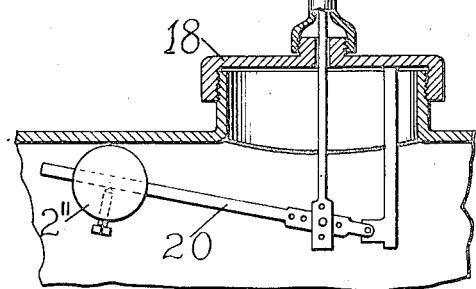

1,432,385

UNITED STATES PATENT OFFICE.

WALTER WM. CONNERS, OF ELIZABETH, NEW JERSEY.

LIQUID-LEVEL-CONDITION WARNING SYSTEM.

Application filed August 8, 1921. Serial No. 490,557.

*To all whom it may concern:*

Be it known that I, WALTER W. CONNERS, a citizen of the United States, residing at Elizabeth, in the county of Union and State of New Jersey, have invented certain new and useful Improvements in Liquid-Level-Condition Warning Systems, of which the following is a specification.

My invention relates to improvements in liquid level condition alarm and warning systems and is shown as being especially adapted to an automobile or the like; and the objects of my improvements are, first, to provide a simple, efficient system which is capable of extensive utility; second, to render warnings in a visual, motion or acoustical manner or such in combination; third, to fabricate such a device, for particular uses, as a single unit.

How I attain these and other objects is illustrated in the accompanying drawings, in which:

Figure 1 is a vertical cross sectional view of a simple form of the device shown as being adapted to the radiator filling cap of an automobile, or the like;

Fig. 2, a front view of the complete device shown in Fig. 1;

Fig. 3, a slight modification of Fig. 1, showing an application of the motion and acoustical warning elements;

Fig. 4, shows a multiple function application of Fig. 1;

Fig. 5, shows an adaptation to the gasoline tank of an automobile;

Fig. 6, a similar adaptation to Fig. 5 but to the storage battery,

Similar numerals refer to similar parts throughout the several views.

Referring to Fig. 1, the shown portion of the liquid container 1 is, in this instance, the radiator of an automobile. The float 2 and the rod, or the like, 3 which is appropriately attached to it, are enclosed by a decorative housing member 4 which is shown, although not necessarily, as being a part of the usual radiator filling cap. At the upper end of the rod 3 is secured the preferably transparent or translucent or refractive indicator plate 5 which may be, as is described later, appropriately symbolized or characterized.

The openings or preferably the transparent portion 6 are so positioned in the relative fabrication of the other said parts that only below a chosen liquid level, or its corresponding float position, will the said plate symbolization, et cetera, annunciate such condition. The reverse of such conditions may be indicated by appropriate characters, et cetera, 7.

To prevent undue chattering or the like of the float mechanism due to such causes as the splashing and the circulation of the liquid, et cetera, only small liquid passages 8 may be provided. However, means are provided to restrain any such action that still may exist; such may consist of the piston or the like 9 shown as a part of the rod 3, and as it bears an almost air tight relation to the walls of the cylinder 10, its motion is thus retarded. The retarded exit of the liquid from below the float helps to perform the same function in the reverse direction, such actions are more fully described later. It is obvious that the lower portion of the housing member also acts as a float guard.

In the exterior view of the device, shown in Fig. 2, the dotted elements illustrate a suitable lettering for the before partially described plate characterization, et cetera. It is obvious that such elements may be attractively colored or contain a luminous or reflecting paint or the like such as a radium compound, or constructed as is before described, thus allowing a readable night indication.

While the device above described does indicate such conditions in practice it is not always so observed, for some reason or other, until possibly damage has resulted from such neglect. To overcome such objections I preferably employ an energizable means such as an appropriate propeller 12, Fig. 3, rigidly secured to a crankshaft like element 13 which is rotatably mounted on the housing member 4 in such a manner that when the float 2 is above its lower positions a projection 14 of the rod 3 prohibits a rotary movement of the element 13. Therefore, when the liquid level is, say dangerously, low the revolving of the propeller, caused by the draft produced by the movement of the automobile, produces a motion (or a continuous change of state) warning or indication of such conditions. In certain similar cases when it is desired to produce such effects in an acoustical manner a reed or the like 15 may be so positioned, in relation to the rotating path of the crank portion of the element 13, that it would be caused to vibrate. In this view the wall 16 acts as a retarder of the escapement of the liquid above the float for the purpose as is before described.

When a plurality of such indications or effects are desired the rod 3, Fig. 4, may be hollow and have extending through it a rod 3' which may be attached to similar acting float 2' and indicator plate 5'. In this case the plate 5 is preferably so arranged that when in its lowest position it does not completely cover the upper area of the said opening 6; such space being reserved for the lowest position of plate 5'. It is obvious that such an arrangement may be in combination with the before described arrangements.

In certain adaptations such as in connection with the automobile gas tank it may be desirous to remotely locate from the liquid the indicator and the said effect producing elements or it may be desirous to make the plate element a perpetual liquid level condition indicator. To such ends I provide an armed cap 18, Fig. 5, upon which is hinged the lever 20 that bears the adjustable float 2''. The calibrated housing member 4' supporting the adjustably hinged indicator hand 5'' is connected to the said cap 18 by means of the tube or the like 19, through which extends the semi-rigid rod 3'' that serves as a connecting means between the lever 20 and the hand 5''. The before described projection 14 may bear such a relation that the propeller elements may be similarly freed at any desired point or condition. The spring 21 makes it possible to use a chain or the like in place of the rod 3''.

The arrangement shown in Fig. 6 is especially adaptable to a storage battery. In this arrangement the rod 3'' is rigidly secured to the bar 24 which has loosely extending through it the rods 3''' which may be in turn secured to housed floats similar to Fig. 1; in this case the housing 4 may be exteriorly threaded so that it may be screwed in the usual storage battery opening. Rigidly secured to the rods 3''' are the stop washers 25.

Suppose for example that in the above arrangement a propeller unit similar to that described in Fig. 5 was used in connection with the rod 3'', Fig. 6, and that the various elements were so adjusted that when the liquid is above the low liquid level, or point, the position of the washers 25 allows the bar to assume an upward position, then, it is obvious that a low liquid level will allow the weight of the corresponding float to pull the bar 24 downward thereby freeing the propeller for the purpose before described.

In certain cases such as when vibration is extreme the weight of the float elements may be mechanically balanced by a counterpoise or the like, 27, Fig. 5.

It is obvious there are numerous evident combinations and adaptations of the invention not shown. For instance the housing 4 or 4' might be fabricated in the form of an image of a person or implement—say for example a police officer or an aeroplane. In such instances the hand 5'', Fig. 5, might represent the hand of the officer or in the latter case the elevator. An adaptation of the device to the lubricating is also of special importance.

I claim:

1. A liquid level device of the class described, consisting of a float, and a housing member with a rotatable propeller mounted thereon and means to normally incapacitate rotativity; connecting means between said means and float so arranged that below a chosen liquid level the said propeller's rotatability is restored for the purpose set forth.

2. A liquid level device of the class described, consisting of a float, and a housing member with a rotatable propeller mounted thereon in operative relation to a sounding member, and means to normally incapacitate rotativity; connecting means between said means and float so arranged that below a chosen liquid level the said propeller's rotatability is restored for the purpose set forth.

3. A liquid level device of the class described, consisting of a base member, a float, a housing member with a rotatable propeller, operatively related to a sounding member, and a liquid level indicator mounted thereon and means to normally incapacitate the propeller's rotatability, connecting means between said means, indicator and float so arranged that below a chosen liquid level the said indicator not only so indicates but the said propeller's rotatability is restored for the purpose set forth.

4. A liquid level device of the class described, consisting of a base member, a float, a housing member with a rotatable propeller, and a liquid level indicator mounted thereon and means to normally incapacitate the propeller's rotatability; connecting means between said means, indicator and float so arranged that below a chosen liquid level the said indicator not only so indicates but the said propeller's rotatability is restored for the purposes set forth.

In testimony whereof I affix my signature.

WALTER WM. CONNERS.